(12) United States Patent
Daicho et al.

(10) Patent No.: US 10,132,459 B2
(45) Date of Patent: Nov. 20, 2018

(54) LAMP

(71) Applicant: Koito Manufacturing Co., Ltd., Tokyo (JP)

(72) Inventors: Hisayoshi Daicho, Shizuoka (JP); Toshio Yagi, Shizuoka (JP); Shogo Sugimori, Shizuoka (JP); Yu Shinomiya, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 15/398,040

(22) Filed: Jan. 4, 2017

(65) Prior Publication Data

US 2017/0113605 A1    Apr. 27, 2017

Related U.S. Application Data

(63) Continuation of application No. PCT/JP2015/069952, filed on Jul. 10, 2015.

(30) Foreign Application Priority Data

Jul. 10, 2014    (JP) .................................. 2014-142558

(51) Int. Cl.
  *B60Q 1/00* (2006.01)
  *F21S 43/00* (2018.01)
  (Continued)

(52) U.S. Cl.
  CPC ............ *F21S 43/00* (2018.01); *B60Q 1/2607* (2013.01); *B60Q 1/2696* (2013.01); *B60Q 1/38* (2013.01);
  (Continued)

(58) Field of Classification Search
  None
  See application file for complete search history.

(56) References Cited

U.S. PATENT DOCUMENTS 7,618,157 B1    11/2009    Galvez
2002/0176259 A1    11/2002    Ducharme
(Continued)

FOREIGN PATENT DOCUMENTS

CN    102537805 A    7/2012
CN    102893078 A    1/2013
(Continued)

OTHER PUBLICATIONS

International Search Report from International Application No. PCT/JP2015/069952, dated Oct. 6, 2015.
(Continued)

*Primary Examiner* — Andrew Coughlin

(57) ABSTRACT

A lamp includes a plurality of semiconductor light-emitting elements arrayed linearly, an aluminum substrate on which the plurality of light-emitting elements are mounted, and a linear light wavelength conversion member disposed separated from light-emitting surfaces of the plurality of light-emitting elements. The aluminum substrate includes a circuit formed such as to be able to switch on/off the plurality of light-emitting elements, as grouped into a plurality of sets, on a per-set basis in which the sets are composed of either one or a plurality of the light-emitting elements.

9 Claims, 16 Drawing Sheets

(51) Int. Cl.

| | | |
|---|---|---|
| *B60Q 1/26* | (2006.01) | |
| *B60Q 1/38* | (2006.01) | |
| *F21K 9/64* | (2016.01) | |
| *F21S 43/19* | (2018.01) | |
| *F21S 43/13* | (2018.01) | |
| *F21S 43/14* | (2018.01) | |
| *F21S 43/145* | (2018.01) | |
| *F21S 43/15* | (2018.01) | |
| *F21Y 103/10* | (2016.01) | |

(52) U.S. Cl.
CPC ............. *B60Q 1/382* (2013.01); *F21K 9/64* (2016.08); *F21S 43/13* (2018.01); *F21S 43/14* (2018.01); *F21S 43/145* (2018.01); *F21S 43/15* (2018.01); *F21S 43/195* (2018.01); *F21Y 2103/10* (2016.08)

(56) References Cited

U.S. PATENT DOCUMENTS

| | | | |
|---|---|---|---|
| 2002/0176529 A1 | 11/2002 | Ducharme | |
| 2006/0028837 A1 | 2/2006 | Mrakovich | |
| 2006/0092658 A1 | 5/2006 | Scholz | |
| 2008/0013335 A1 | 1/2008 | Tsutsumi | |
| 2009/0184333 A1* | 7/2009 | Wang | H01L 33/508 257/88 |
| 2010/0019689 A1* | 1/2010 | Shan | G09F 9/33 315/294 |
| 2013/0127340 A1 | 5/2013 | Huhn | |
| 2013/0293098 A1 | 11/2013 | Li | |
| 2013/0329445 A1 | 12/2013 | Oh | |
| 2017/0356635 A1 | 12/2017 | Zawacki | |

FOREIGN PATENT DOCUMENTS

| | | |
|---|---|---|
| EP | 0980788 A2 | 2/2000 |
| EP | 2985516 A1 | 2/2016 |
| JP | 2004-039329 A | 2/2004 |
| JP | 2006-032045 A | 2/2006 |
| JP | 2010-0015910 A | 1/2010 |
| JP | 2011-243356 A | 12/2011 |
| JP | 2012-099238 A | 5/2012 |
| JP | 2012-243979 A | 12/2012 |
| JP | 2013-033938 A | 2/2013 |
| JP | 2013-182838 A | 9/2013 |

OTHER PUBLICATIONS

International Preliminary Report on Patentability from International Application No. PCT/JP2015/069952, dated Oct. 6, 2015.
International Search Report from International Application No. PCT/JP2015/069953, dated Oct. 6, 2015.
International Preliminary Report on Patentability from International Application No. PCT/JP2015/069953, dated Oct. 6, 2015.
Extended European Search Report from European Patent Application No. 15819154.4, dated May 24, 2018.
Official Action on corresponding CN Application No. 201580037709.1, dated Jul. 4, 2018.

* cited by examiner

360

370

LAMP

INCORPORATION BY REFERENCE

This application is based upon and claims the benefit of priority from the prior Japanese Patent Application No. 2014-142558, filed on Jul. 10, 2014 and International Patent Application No. PCT/JP2015/069952, filed on Jul. 10, 2015, the entire content of each of which is incorporated herein by reference.

BACKGROUND

Technical Field

The present invention relates to a lamp provided with a plurality of light-emitting elements.

Background Art

To date, a light-emitting module has been devised in which a plurality of semiconductor light-emitting elements are mounted on a flexible printed circuit board and light-emitting surfaces of the respective semiconductor light-emitting elements are covered by a phosphor-containing resin (see patent document 1). Such a light-emitting module is used, for example, as a linear light source, such as a turn-signal lamp.

Patent Document 1: JP2013-33938

Problem to be Solved by the Invention

However, when semiconductor light-emitting elements that emit light with strong directionality are used in the aforementioned light-emitting module, a dim portion may be generated between the elements. Therefore, the configuration and the arrangement of semiconductor light-emitting elements and a phosphor-containing resin in a light-emitting module need to be optimized.

Means to Solve the Problem

The present invention has been made in view of such a situation and is directed to providing a lamp with less gradation in brightness of a light-emitting surface.

In order to solve the problem described above, a lamp according to an aspect of the present invention includes a plurality of light-emitting elements arrayed linearly, a substrate on which the plurality of light-emitting elements are mounted, and a linear light wavelength conversion member disposed separated from light-emitting surfaces of the plurality of light-emitting elements. The substrate includes a circuit formed such as to be able to switch on/off the plurality of light-emitting elements, as grouped into a plurality of sets, on a per-set basis in which the sets are composed of either one or a plurality of the light-emitting elements.

BRIEF DESCRIPTION OF THE DRAWINGS

Embodiments will now be described, by way of example only, with reference to the accompanying drawings that are meant to be exemplary, not limiting, and wherein like elements are numbered alike in several figures, in which.

MODES FOR CARRYING OUT THE INVENTION

Figure 1:
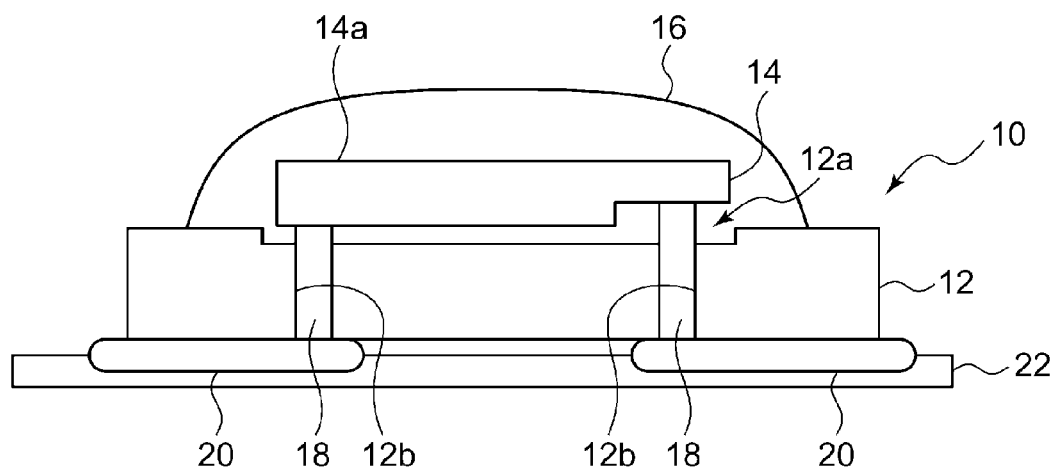
FIG. 1 is an illustration for describing a light-emitting module provided with a semiconductor light-emitting element according to a first embodiment.

A lamp according to an aspect of the present invention includes a plurality of light-emitting elements arrayed linearly, a substrate on which the plurality of light-emitting elements are mounted, and a linear light wavelength conversion member disposed separated from light-emitting surfaces of the plurality of light-emitting elements. The substrate includes a circuit formed such as to be able to switch on/off the plurality of light-emitting elements, as grouped into a plurality of sets, on a per-set basis in which the sets are composed of either one or a plurality of the light-emitting elements.

According to this aspect, the light wavelength conversion member is disposed separated from the light-emitting surfaces of the light-emitting elements. Therefore, element light emitted by the light-emitting elements is incident on the light wavelength conversion member with some divergence. Consequently, the gradation in brightness (luminance) of the light-emitting surface of the light wavelength conversion member can be reduced.

The light wavelength conversion member may include a retaining member provided with a groove, on a conversion-member side opposing the plurality of light-emitting elements, and a phosphor-containing resin layer filling the groove in the holding member. In addition, the light wavelength conversion member may include a retaining member provided on a conversion-member side opposing the plurality of light-emitting elements, and a phosphor-containing resin layer retained by the retaining member. The light wavelength conversion member may be affixed to the retaining member through bonding. Furthermore, the light wavelength conversion member can also be mounted immediately above the plurality of light-emitting elements. Thus, the light wavelength conversion member can be disposed separated from the light-emitting surfaces of the light-emitting elements with ease.

A shading portion (a light-shielder), a reflection portion, or a light wavelength convertor for making it so that among component light emitted by the light-emitting elements, component light not directed to the phosphor-containing resin layer does not as-is penetrate exteriorly.

The substrate may include a first substrate section and a second substrate section carrying respective pluralities of the light-emitting elements. The first substrate section may be disposed such that the light-emitting surfaces of the carried plurality of light-emitting elements are oriented either vehicle-frontward or vehicle-rearward, and the second substrate section may be disposed such as to be oriented vehicle-sideward of the light-emitting surfaces of the plurality of light-emitting elements carried on the first substrate section. Thus, the luminance when the lamp is seen straight from the front or straight from the back can be improved.

The plurality of light-emitting elements carried on the first substrate section are of mounting density higher than mounting density of the light-emitting elements carried on the second substrate section. Thus, the luminance when the lamp is seen straight from the front or straight from the back can be improved.

The light-emitting elements carried on the first substrate section may be disposed vertically in a plurality of arrays extending vehicle-widthwise. The luminance when the lamp is seen straight from the front or straight from the back can be increased.

The substrate may include a plurality of carrying sections extending vehicle-widthwise in a terraced form. The plurality of carrying sections may be formed such as to be oriented either vehicle-frontward or vehicle-rearward, and the light-emitting elements may be carried respectively on the carrying sections. Thus, the luminance when the lamp is seen straight from the front or straight from the back can be increased.

The light-emitting elements may have a peak wavelength in a range of 380-470 nm.

The light wavelength conversion member may contain a phosphor having a dominant wavelength in a range of 585-610 nm.

It is to be noted that any optional combinations of the above constituent elements and an embodiment obtained by converting what is expressed by the present invention into a method, an apparatus, a system, and so on are also effective as an embodiment of the present invention.

Hereinafter, modes for embodying the present invention will be descried in detail with reference to the drawings. In the description of the drawings, identical elements are given identical reference characters, and duplicate descriptions thereof will be omitted as appropriate. In each of the following embodiments, an example of a lamp suitable for a vehicular turn-signal lamp will be described, but the lamp of course can be used for other purposes aside from one for a vehicle.

A vehicular turn-signal lamp is being devised that emits light in a horizontally elongated lamp shape so that the direction into which the vehicle turns is easily recognized by those around the vehicle. In addition, various types of sequential control that causes the lighting portion of a lamp that emits light to move in the direction into which the vehicle turns are being contemplated. Such a lighting state is achieved, in a lamp in which a plurality of light sources (primarily, semiconductor light-emitting elements, such as LEDs) are arrayed linearly with a space provided therebetween, by causing the plurality of light sources to successively emit light with a delay in the direction into which the vehicle turns.

However, in such a lamp, only the portions in which the plurality of light sources are mounted emit light, and a region between the light sources does not emit light, which thus results in dotted or dashed linear light emission in an extreme sense. Therefore, there is room for further improvement in order to achieve continuous linear light emission in which a gap between light-emitting portions or the light and shade is less noticeable. Accordingly, in each of the embodiments, a novel configuration that takes this point into consideration will be described.

First Embodiment

Light-Emitting Module

FIG. 1 is an illustration for describing a light-emitting module provided with a semiconductor light-emitting element according to a first embodiment. A light-emitting module 10 illustrated in FIG. 1 includes an alumina substrate 12, a semiconductor light-emitting element 14, and a resin layer 16 that seals the semiconductor light-emitting element 14. The alumina substrate 12 is square in shape having a size of 2 mm by 2 mm and has a recess portion 12a having a diameter of 0.8 mm and a depth of 0.1 mm formed in the upper surface at the center thereof. A feeder pattern of copper plating is formed in the recess portion 12a with a Ti-based buffer layer interposed therebetween.

The alumina substrate 12 has a through-hole via 12b formed therein, and the interior of the through-hole via 12b is filled with copper 18. The copper 18 is electrically continuous with an electrode pattern on the back surface of the alumina substrate 12. A portion of the electrode pattern on the alumina substrate 12 is connected to an aluminum substrate 22 with solder 20, and thus the light-emitting module 10 is mounted to the aluminum substrate 22. In place of the aluminum substrate 22, a flexible printed board, a glass-containing epoxy resin substrate, a ceramic substrate, or the like may also be used.

Semiconductor Light-Emitting Element

The semiconductor light-emitting element 14 is a 0.5 mm□ (mm square) flip-chip element in which an InGaN-based material is used as a light-emitting layer and has a peak wavelength in a range of 380-470 nm. The semiconductor light-emitting element 14 is FC (flip-chip) mounted in the recess portion 12a in the alumina substrate 12. A method in which the semiconductor light-emitting element 14 is die-bonded with transparent silicone serving as a die-bonding agent and is then wire-bonded with a gold wire or the like may also be employed.

Resin Layer

The resin layer 16 is a transparent or semi-transparent dimethyl silicone resin (may contain a silica thixotropic agent having a mean particle size of 150 nm at 0.5 volume %) in which a phosphor is dispersed at 0.5 volume %, and the resin layer 16 is cured with a predetermined curing condition (150° C. for one hour) and seals the semiconductor light-emitting element 14. It is preferable that the concentration of the phosphor contained in the resin layer 16 be 0.1-30 volume %. When the concentration of the phosphor is lower than 0.1 volume %, the thickness of the resin layer 16 containing the phosphor needs to be increased, and the light-emitting portion becomes too large as a result. Therefore, the resin layer 16 is subject to a constraint when it is mounted as a vehicular lamp. On the other hand, when the concentration of the phosphor is higher than 30 volume %, the thickness of the resin layer 16 containing the phosphor is reduced. Thus, only a portion immediately above the semiconductor light-emitting element 14 emits light, and it becomes difficult to obtain continuous linear light emission.

Phosphor

The phosphor is a phosphor expressed, for example, by the general formula $Me_x Si_{12-(m+n)} Al_{(m+n)} O_n N_{16-n}:EU^{2+}_y$ (Me is a divalent alkaline-earth metal ion that is primarily Ca; x, m, n, and y are positive numbers satisfying, respectively, $0.6 \leq x \leq 1.2$, $1.2 \leq m \leq 2.4$, $0.1 \leq n \leq 2.4$, and $0.0001 \leq y \leq 0.1$).

The phosphor may also be a phosphor expressed by the general formula $Ca_{3-a-b} M_a SiO_4 Cl_2$ (M is Sr or Mg; when M is Sr, $0 \leq a \leq 0.15$ is satisfied; when M is Mg, $0 \leq a \leq 0.10$ and $0 < b \leq 0.10$ are satisfied).

The dominant wavelength of these phosphors lies in a range of 585-610 nm. It is preferable that the mean particle size of the phosphor be 1-40 μm. When the mean particle size of the phosphor is smaller than 1 μm, the quantum efficiency decreases. When the mean particle size of the phosphor is larger than 40 μm, the phosphor is more likely to sink in a transparent resin upon being dispersed therein, and the uniformity in the luminance between a portion immediately above a semiconductor light-emitting element and a portion between elements decreases. The phosphor according to the present embodiment has a composition of $Ca_{0.810} Si_{9.345} Al_{2.655} O_{0.875} N_{15.125}:EU_{0.080}$, a mean particle size of 18 μm, and a dominant wavelength of 594 nm.

Lamp

Figure 2:
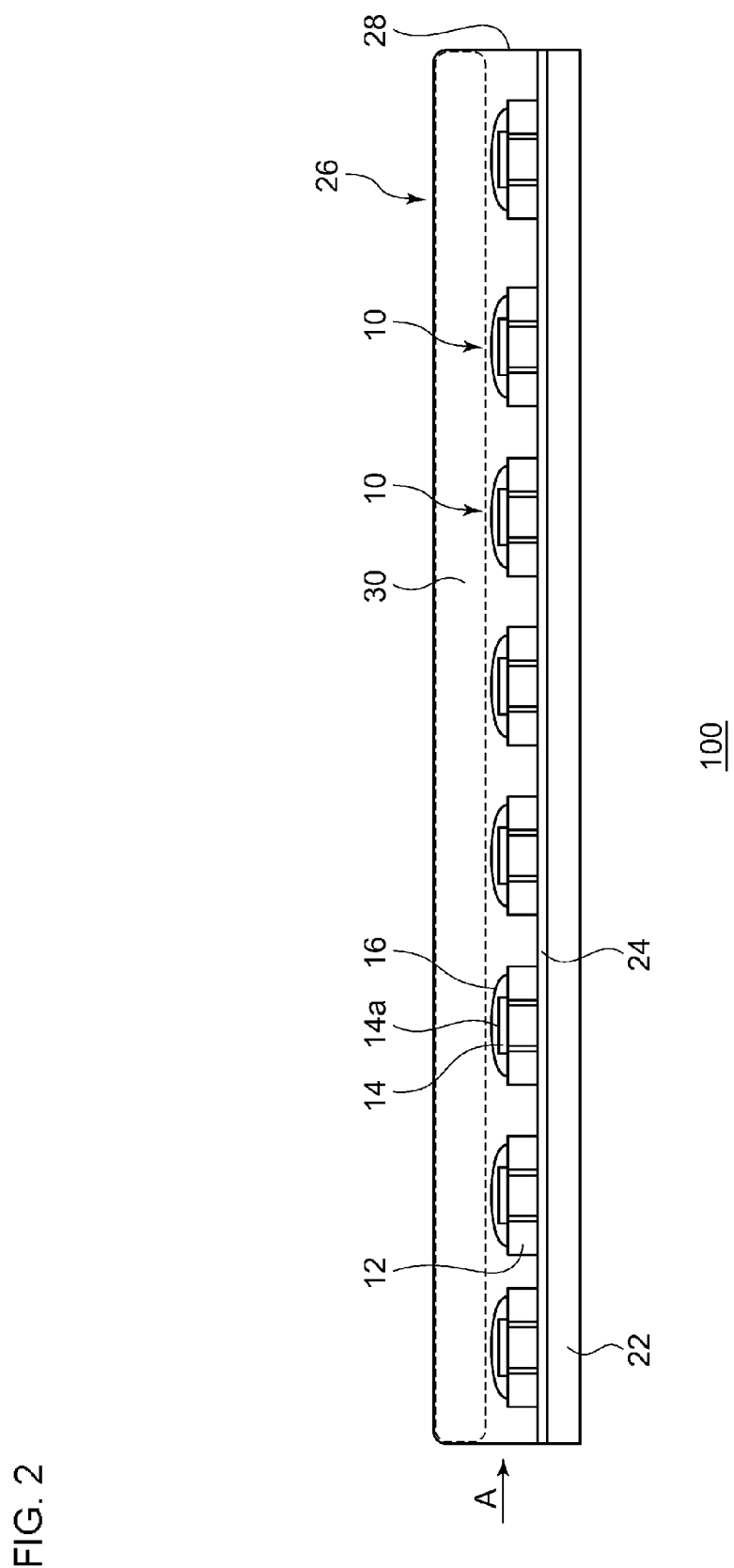
FIG. 2 is a schematic diagram illustrating a general configuration of a lamp according to the first embodiment.
Figure 3:
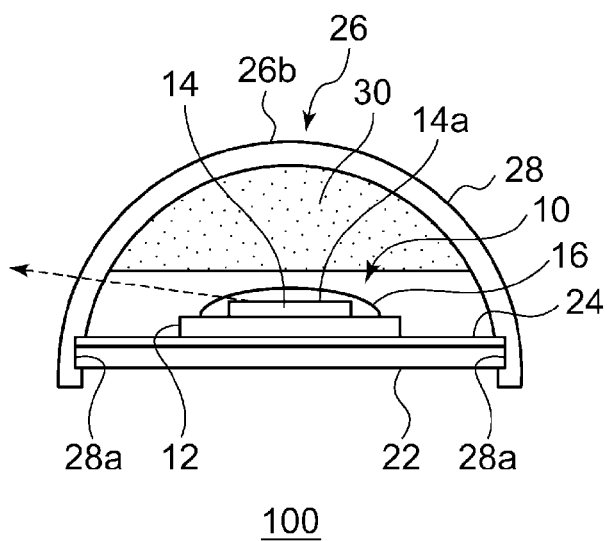
FIG. 3 is a schematic diagram of FIG. 2 as viewed in the direction A.

FIG. 2 is a schematic diagram illustrating a general configuration of the lamp according to the first embodiment. FIG. 3 is a schematic diagram of FIG. 2 as viewed in the direction A. The aluminum substrate 22 illustrated in FIG. 2 is a plate-like member having a length of 200 mm, a width of 25 mm, and a thickness of 0.5 mm, and a plurality of (approximately five to fifty) light-emitting modules 10 described above are mounted linearly on the aluminum substrate 22. The interval between adjacent semiconductor light-emitting elements 14 may be approximately 1-20 mm and is approximately 8 mm (5-10 mm) in the present embodiment. A reflection layer 24 is formed on the mounting surface of the aluminum substrate 22. As the reflection layer 24, for example, a white resist with visible light reflectance of 88% is being applied.

The lamp 100 according to the first embodiment includes the plurality of semiconductor light-emitting elements 14 that are arrayed linearly, the aluminum substrate 22 on which the plurality of light-emitting elements 14 are mounted, and a linear light wavelength conversion member 26 disposed at a distance from light-emitting surfaces 14a of the plurality of light-emitting elements 14. The plurality of light-emitting elements 14 are divided into a plurality of groups that each consist of one or a plurality of light-emitting elements 14, and the aluminum substrate 22 includes a circuit configured to be capable of turning on/off each of the groups of light-emitting element(s) 14. The circuit may also be configured to be capable of turning on/off the semiconductor light-emitting elements 14 individually.

Light Wavelength Conversion Member

The light wavelength conversion member 26 includes a holding member 28 having U-shaped grooves provided therein on a side that opposes the plurality of semiconductor light-emitting elements 14, and a phosphor-containing resin layer 30 filling the grooves in the holding member 28. The light wavelength conversion member 26 can also be mounted immediately above the plurality of semiconductor light-emitting elements 14. The holding member 28 is a cylindrical molded product made of an acrylic resin and has a width of 6 mm, a depth of 6 mm, and a length of 200 mm. The acrylic resin may be clear or may be smoke-colored in gray, brown, or the like. The holding member 28 can also be made of a transparent resin (polycarbonate, polyester, cyclopolyolefin, polystyrene, etc.).

Phosphor-Containing Resin Layer

The phosphor-containing resin layer 30 is formed through the following procedures. First, the above-described phosphor is dispersed and degassed with a vacuum planetary centrifugal mixer so that the phosphor is dispersed in a transparent silicone resin at a proportion of 1 volume %, and thus a phosphor paste is prepared. Next, this phosphor paste is injected into the U-shaped grooves in the holding member 28 to the depth of 3 mm and is heated at 80° C. for one hour to be cured. Thus, the phosphor-containing resin layer 30 is formed. With this, the light wavelength conversion member 26 in which a space is formed in the vicinity of the opening in the U-shaped holding member 28 is fabricated. Then, end portions of the aluminum substrate 22 are pinched by grooves 28a formed in the vicinity of the opening in the U-shaped holding member 28, and thus the light wavelength conversion member 26 and the aluminum substrate 22 are fixed to each other. When fixing, an adhesive may be applied to the grooves 28a.

In this manner, in the lamp 100, the light wavelength conversion member 26 (the phosphor-containing resin layer 30) is disposed at a distance from the light-emitting surfaces 14a of the semiconductor light-emitting elements 14. Therefore, element light emitted by the light-emitting elements is incident on the phosphor-containing resin layer 30 with some divergence. Consequently, the gradation in brightness (luminance) of the light-emitting surface 26b of the light wavelength conversion member can be reduced.

In addition, the light wavelength conversion member 26 is positioned to the aluminum substrate 22 via the holding member 28, and thus the light wavelength conversion member 26 (the phosphor-containing resin layer 30) can be disposed at a distance from the light-emitting surfaces 14a of the semiconductor light-emitting elements 14 with ease.

In addition, in the lamp 100 and the light-emitting module 10 according to the first embodiment, the phosphor-containing resin layer 30 and the light-emitting surfaces 14a of the semiconductor light-emitting elements 14 are at a distance from each other. Therefore, it is conceivable that a portion of the element light emitted by the semiconductor light-emitting elements 14 that does not travel toward the phosphor-containing resin layer 30 (the dotted arrow indicated in FIG. 3) is transmitted as-is to the outside. In particular, when the element light of the semiconductor light-emitting elements 14 is ultraviolet radiation or short-wavelength visible light that acts as excitation light for the phosphor but does not contribute much to the formation of emission color of the lamp, it is desirable that such element light be prevented from being emitted to the outside without having its wavelength converted by the phosphor.

Therefore, in the lamp 100 according to the first embodiment, the resin layer 16 is provided so that a portion of the element light emitted by the semiconductor light-emitting elements 14 that does not travel toward the phosphor-containing resin layer 30 is not transmitted as-is to the outside. The resin layer 16 that covers the light-emitting surfaces 14a contains a phosphor as described above and can reliably convert the wavelength of the element light that includes ultraviolet radiation and short-wavelength visible light. The resin layer 16 containing the phosphor may be mounted so as to surround only side surfaces of the semiconductor light-emitting elements 14. In place of the resin layer 16, a shading portion or a reflection layer may be provided so that the element light is not transmitted as-is to the outside.

Figure 4:
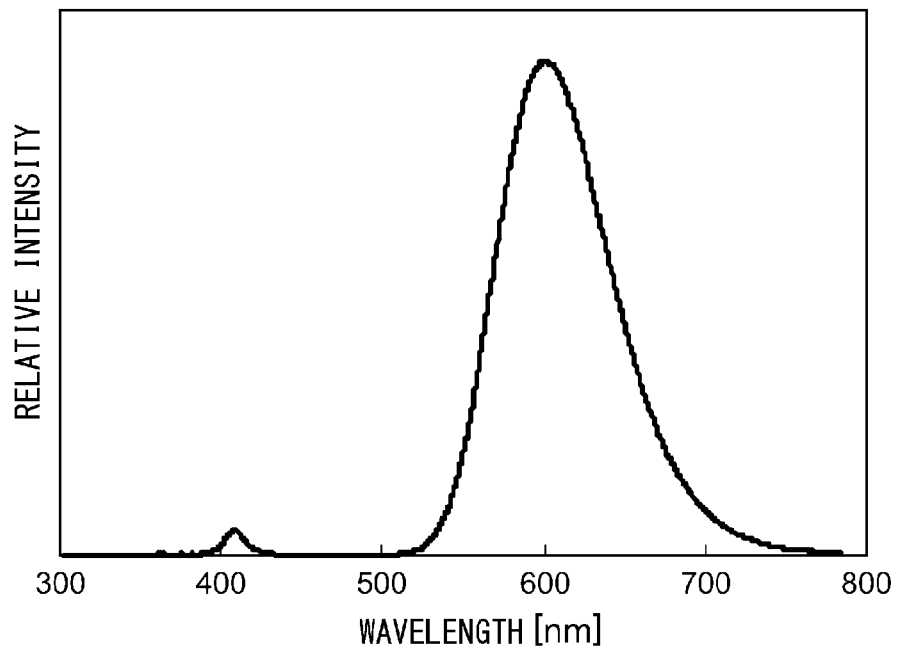
FIG. 4 illustrates an example of an emission spectrum of the lamp according to the first embodiment.
Figure 5:
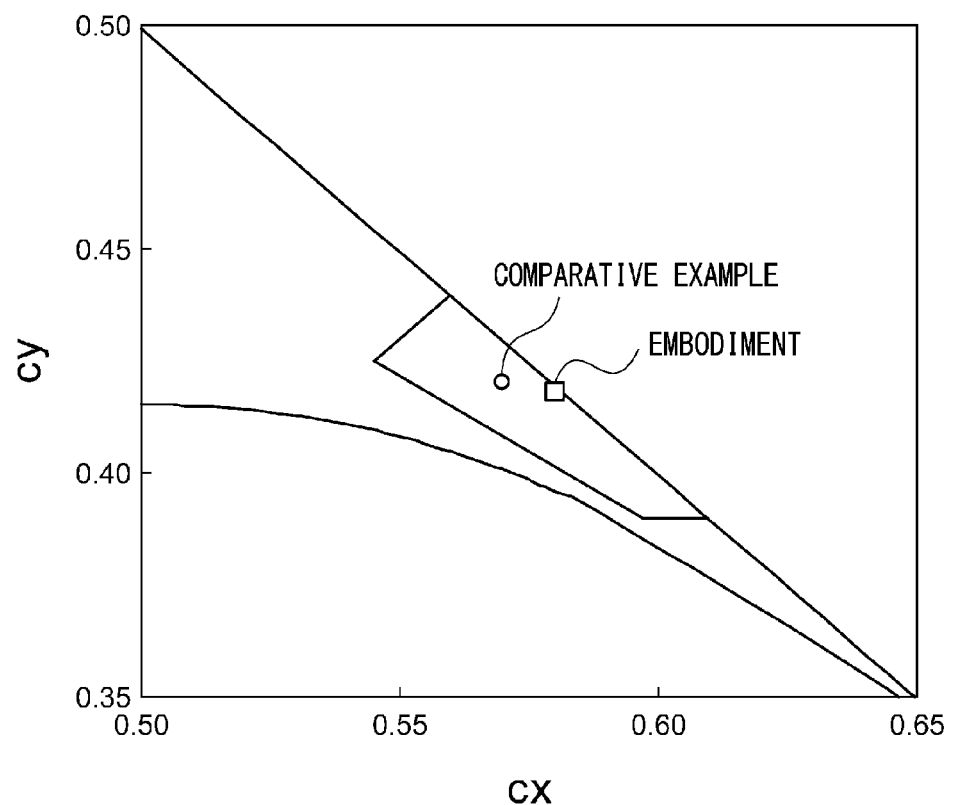
FIG. 5 illustrates a range that satisfies the chromaticity required for a turn-signal lamp and the chromaticity of light emitted by the lamp according to the present embodiment.

FIG. 4 illustrates an example of an emission spectrum of the lamp according to the first embodiment. FIG. 4 reveals that the light wavelength conversion member 26 of the lamp 100 contains a phosphor having a dominant wavelength in a range of 585-610 nm. FIG. 5 illustrates a range that satisfies the chromaticity required for a turn-signal lamp and the chromaticity of the light emitted by the lamp according to the present embodiment. The lamp 100 emits light in a color in a range enclosed by (y≥0.39, y≥0.79-0.67x, y≤x-0.12) on the chromaticity coordinates (cx,cy). FIGS. 4 and 5 reveal that the lamp 100 according to the present embodiment emits light in a color suitable for a turn-signal lamp. Specific results are shown in Table 1.

TABLE 1

| Module | Luminous efficacy Ratio (%) | Chromaticity (cx, cy) | Luminance uniformity ratio (%) |
|---|---|---|---|
| Embodiment | 160 | 0.580, 0.418 | 45 |
| Comparative Example | 100 | 0.570, 0.420 | 0.2 |

Comparative Example

Figure 6:
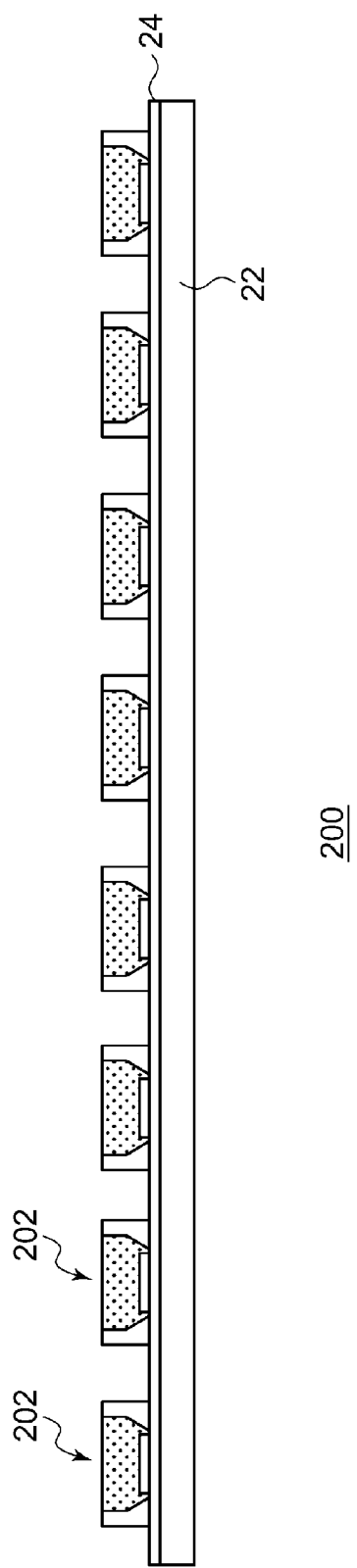
FIG. 6 is a schematic diagram illustrating a general configuration of a lamp according to a comparative example.

FIG. 6 is a schematic diagram illustrating a general configuration of a lamp according to a comparative example. A lamp 200 illustrated in FIG. 6 is a lamp in which commercially available surface-mount LED packages 202 that emit amber light with the chromaticity (cx,cy=0.570, 0.420) are mounted on an aluminum substrate 22 with solder at an interval of 8 mm. In order to compare with the lamp 100, a reflection layer 24 is formed on the mounting surface of the aluminum substrate 22.

Figure 7:
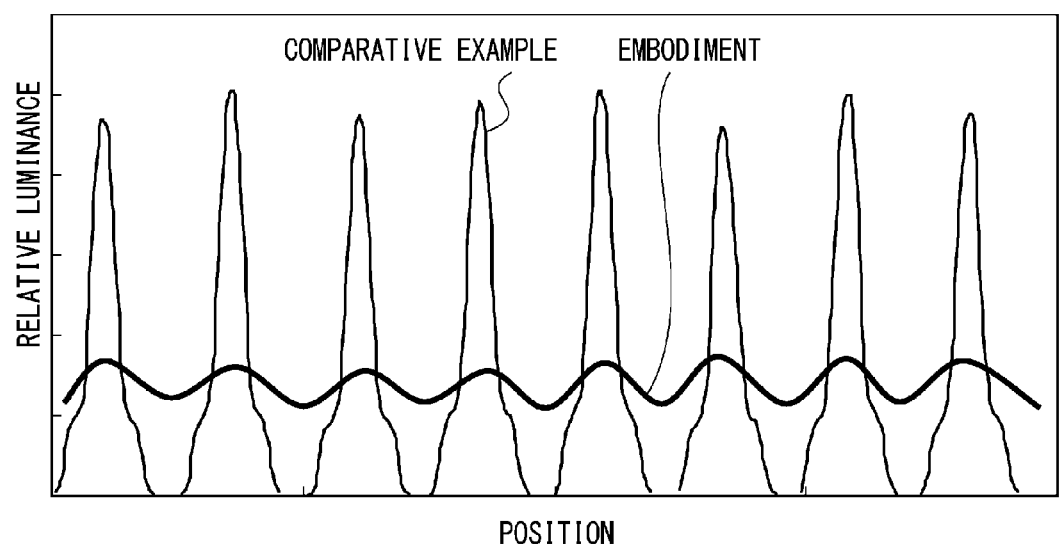
FIG. 7 schematically illustrates the luminance distributions on center lines (longitudinal direction) of the lamp according to the first embodiment and of the lamp according to the comparative example.

FIG. 7 schematically illustrates the luminance distributions on center lines (longitudinal direction) of the lamp 100 according to the first embodiment and of the lamp 200 according to the comparative example. Here, the luminance uniformity ratio S shown in Table 1 can be expressed through the following expression, in which L1 is the mean luminance of the entire light-emitting surface in the longitudinal direction and L2 is the maximum luminance of the lamp in the longitudinal direction.

$S=(L1/L2) \times 100$

In other words, a variation in the luminance of the light-emitting surface is smaller as S is closer to 100, which indicates uniform light emission.

As shown in Table 1 and FIG. 7, the lamp 100 according to the first embodiment has a much larger luminance uniformity ratio S than the lamp 200 according to the comparative example and has less gradation in brightness of the light-emitting surface. In addition, the lamp 100 has higher luminous efficacy than the lamp 200 according to the comparative example. In this manner, the lamp 100 according to the first embodiment has less unevenness in the luminance in the longitudinal direction, which provides an appearance of continuous linear light emission. On the other hand, with the lamp 200 according to the comparative example, a difference in the luminance between portions immediately above the LED packages 202 and a space between the LED packages 202 is large, which provides only an appearance of discontinuous point light sources.

In the lamp 100, a current is applied to a semiconductor light-emitting element at one end, and a current is applied successively to an adjacent semiconductor light-emitting element with a delay time of 0.1-3 seconds provided therebetween. Consequently, the lamp 100 can function as a line light source in which light-emitting portions spread in gradation.

Hereinafter, other modes including the above-described first embodiment will be described in detail.

It is preferable that the length of the lamp 100 in the longitudinal direction be 50-800 mm. In addition, the lamp 100 does not necessarily have to be linear and may include a curved portion of no greater than R15, a curved line, or a curved surface.

The reflection layer 24 may be obtained by subjecting the surface of the aluminum substrate 22 to a mirror surface reflection process with metal such as aluminum or silver.

The semiconductor light-emitting elements 14 to be mounted may be, aside from the flip-chip ones, of a face-up type or a vertical chip type. It is preferable that the recess portion in the alumina substrate 12 be shallow so that the light emitted by the semiconductor light-emitting elements 14 spreads not only in the vertical direction but also toward the sides, and the depth of no greater than 0.5 mm is preferable.

The resin layer 16 or the phosphor-containing resin layer 30 can be provided with thixotropy for maintaining their shapes, preventing the phosphor from sinking, and diffusing the light from the semiconductor light-emitting elements. For the thixotropic agent, silica, titanium oxide, tantalum oxide, zirconia, synthetic mica, or the like having a particle size of 10 nm to 1 μm can be used.

In order to obtain sufficient heat dissipation performance when the lamp 100 is turned on, a heat sink, which serves as a heat dissipation member, may be attached. With regard to the attachment method, a heat sink may be attached directly to the substrate in the lamp through screwing, caulking, or the like, or may be attached to the substrate with a bonding member that is flexible and has a high heat transfer coefficient interposed therebetween. As the bonding member, for example, a heat conductive adhesive, a graphite sheet, a boron nitride sheet, a sheet containing carbon nanotube, or the like can be used.

A lamp provided with a plurality of light-emitting modules 10 that each include a single semiconductor light-emitting element 14 has been described as the lamp 100 in the first embodiment above, but a light-emitting module may be considered as one provided with a plurality of semiconductor light-emitting elements 14 and a linear light wavelength conversion member 26. Whether such a configuration is referred to as a lamp or as a light-emitting module is not essential in the invention of the present application, and these terms are used as appropriate for the purpose of illustration.

Specifically, one provided with a plurality of semiconductor light-emitting elements 14 and a linear light wavelength conversion member 26 may be considered as a light-emitting module, and one in which this light-emitting module and an optical member (e.g., lens, cover, reflector, etc.) are combined may be considered as a lamp. In addition, a lamp may include a plurality of light-emitting modules. Hereinafter, other embodiments will be described.

Second Embodiment

Figure 8:
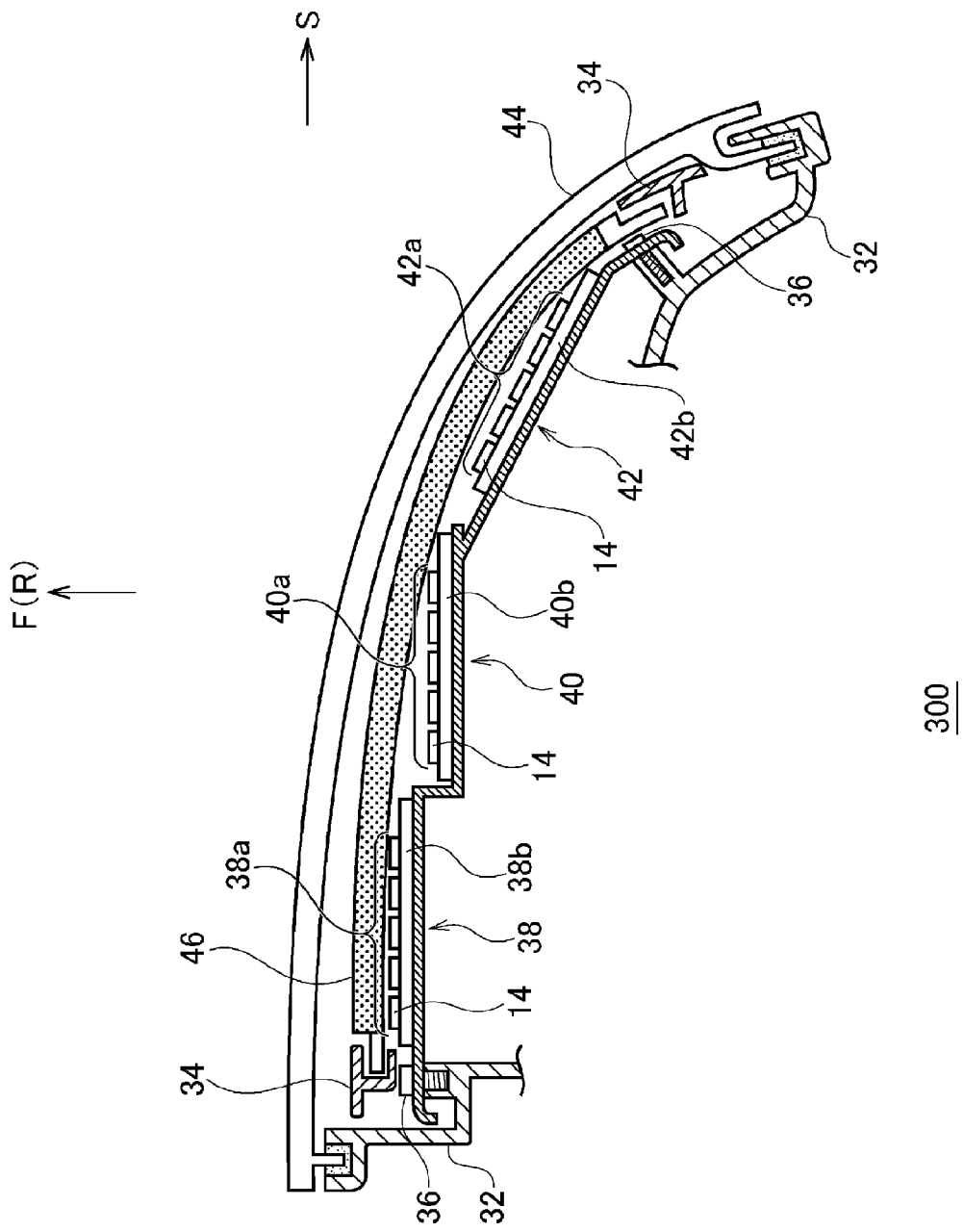
FIG. 8 is a sectional view illustrating a general configuration of a lamp according to a second embodiment.

FIG. 8 is a sectional view illustrating a general configuration of a lamp 300 according to a second embodiment. The lamp 300 illustrated in FIG. 8 includes a lamp body 32, an extension 34, a plurality of light-emitting modules 38, 40, and 42 fixed to the lamp body 32 with screws 36, a cover 44 that functions as a translucent inner lens, and a light wavelength conversion member 46 having an arc shape that follows the inner surface of the cover 44. The lamp 300 functions as a turn-signal lamp.

The light-emitting modules 38, 40, and 42 each include a plurality of semiconductor light-emitting elements 14. The light wavelength conversion member 46 is disposed at a distance from the light-emitting surfaces of the respective light-emitting modules 38, 40, and 42. The light wavelength conversion member 46 contains a phosphor of an amber color having a dominant wavelength in a range of 585-610 nm. Thus, the element light emitted by the semiconductor light-emitting elements 14 is incident on the light wavelength conversion member 46 with some divergence. Consequently, the gradation in brightness (luminance) of the light-emitting surface of the light wavelength conversion member 46 can be reduced.

The plurality of light-emitting elements are divided into a plurality of groups that each consist of one or a plurality of light-emitting elements, and the substrate provided in each light-emitting module includes a circuit configured to be capable of turning on/off each of the groups of light-emitting element(s). As the plurality of semiconductor light-emitting elements 14 are caused to emit light successively with a delay in the direction into which the vehicle turns, and the lamp 300 functions as a turn signal in which light-emitting portions spread in gradation.

However, the light radiated from the light wavelength conversion member 46 is primarily Lambertian light of the phosphor contained therein, which thus results in diffused light with low directionality. Therefore, when the plurality of semiconductor light-emitting elements 14 are disposed in a radial manner in accordance with the shape of the arch-shaped cover 44 or of the light wavelength conversion member 46, although the difference in the luminance associated with the difference in the direction in which the lamp 300 is seen is reduced, the luminance when the vehicle is seen from the front tends to be insufficient.

Accordingly, the light-emitting module 38 in the lamp 300 includes five semiconductor light-emitting elements 14 (corresponding to a first group of light-emitting elements 38a) and a substrate 38b on which the five semiconductor light-emitting elements 14 are mounted linearly. The light-emitting module 40 includes five semiconductor light-emitting elements 14 (corresponding to another group of light-emitting elements 40a) and a substrate 40b on which the five semiconductor light-emitting elements 14 are mounted linearly. The light-emitting module 42 includes five semiconductor light-emitting elements 14 (corresponding to a second group of light-emitting elements 42a) and a substrate 42b on which the five semiconductor light-emitting elements 14 are mounted linearly. The substrates 38b, 40b, and 42b may be continuous with one another in the form of a single component that is bent midway, may be connected to one another with other members interposed therebetween, or may be separate components.

The substrates 38b and 40b (corresponding to first substrates) in the lamp 300 are disposed such that the light-emitting surfaces of the plurality of light-emitting elements 38a and of the plurality of light-emitting elements 40a are oriented toward the front F or the rear R of the vehicle. Meanwhile, the substrate 42b is disposed such that the light-emitting surfaces of the plurality of light-emitting elements 42a are oriented more toward the side S of the vehicle than the light-emitting surfaces of the plurality of light-emitting elements 38a and of the plurality of light-emitting elements 40a. Thus, the luminance when the lamp 300 is seen straight from the front or straight from the back can be improved. In other words, the luminous intensity of the lamp 300 in the direction toward the front (the rear) of the vehicle improves. In this manner, the lamp 300 can achieve a predetermined front luminance.

Third Embodiment

Figure 9:
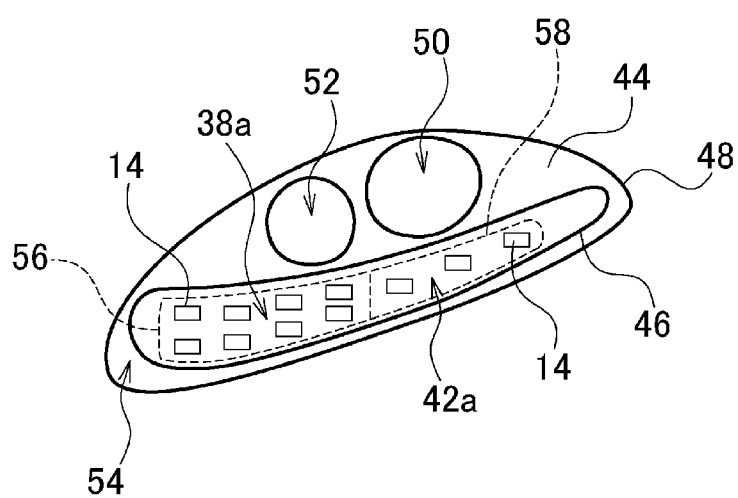
FIG. 9 is a schematic diagram of a lamp according to a third embodiment, as viewed toward the front of the vehicle.

FIG. 9 is a schematic diagram of a lamp 310 according to a third embodiment, as viewed from the front of the vehicle. The lamp 310 includes a lamp body 48, a low-beam lamp unit 50, a high-beam lamp unit 52, a turn-signal lamp unit 54, and a cover 44.

The turn-signal lamp unit 54 includes a linear light wavelength conversion member 46 and a plurality of semiconductor light-emitting elements 14 arrayed linearly. In the turn-signal lamp unit 54, the mounting density of a plurality of light-emitting elements 38a mounted on a first substrate 56 is higher than the mounting density of a plurality of light-emitting elements 42a mounted on a second substrate 58. The plurality of light-emitting elements 38a are mounted on the first substrate 56 in a plurality of vertically arranged arrays extending in the widthwise direction W of the vehicle. Thus, the luminance when the lamp is seen straight from the front or straight from the back can be further improved.

Fourth Embodiment

Figure 10:
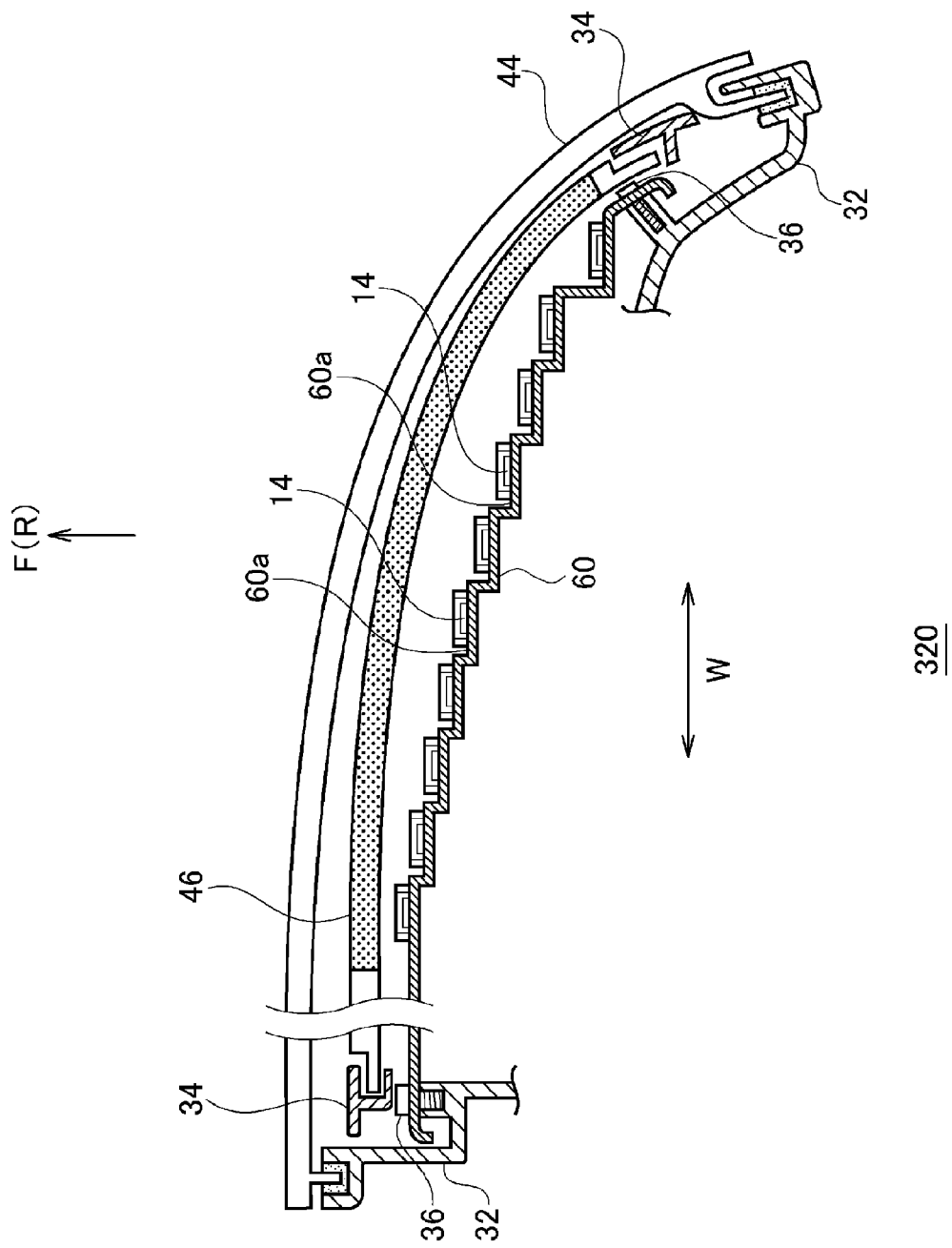
FIG. 10 is a sectional view illustrating a general configuration of a lamp according to a fourth embodiment.

FIG. 10 is a sectional view illustrating a general configuration of a lamp 320 according to a fourth embodiment. In the following description, configurations similar to those of the above-described lamp 300 are given identical reference characters, and descriptions thereof will be omitted as appropriate.

A substrate 60 on which a plurality of semiconductor light-emitting elements 14 are mounted includes a plurality of mounting portions 60a that extend stepwise in the widthwise direction W of the vehicle. The plurality of mounting portions 60a are formed so as to be oriented toward the front F or the rear R of the vehicle, and the semiconductor light-emitting elements 14 are mounted on the respective mounting portions 60a. In this manner, forming the substrate 60 in a step-like shape makes it easier to secure a constant distance between the light-emitting surfaces of the semiconductor light-emitting elements 14 and the cover 44 or the light wavelength conversion member 46 to a certain extent, and the luminance uniformity ratio further improves. In addition, the light-emitting surfaces of all of the semiconductor light-emitting elements 14 are oriented toward the front or the back of the vehicle, and thus the luminance when the lamp 320 is seen straight from the front or straight from the back of the vehicle can be improved.

Figure 11A:
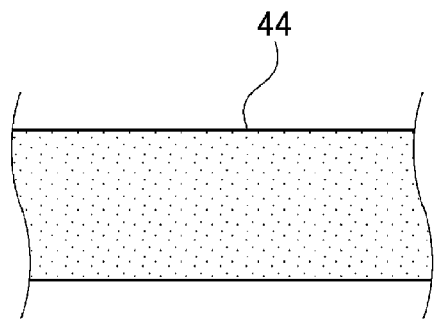
FIG. 11A is a sectional view of a cover containing a phosphor.
Figure 11B:
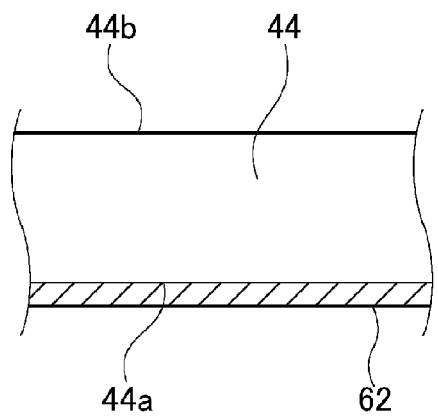
FIG. 11B is a sectional view illustrating a state in which a fluorescent layer is provided on a surface of the cover.

Next, a configuration for further improving the luminance uniformity ratio when the cover 44 is seen from the front in each of the lamps illustrated in FIGS. 8 through 10 will be described. FIG. 11A is a sectional view of the cover containing a phosphor, and FIG. 11B is a sectional view illustrating a state in which a fluorescent layer is provided on the surface of the cover.

The cover 44 illustrated in FIG. 11A is obtained by molding a resin material for the cover with a phosphor kneaded and dispersed therein. The cover 44 illustrated in FIG. 11B has a light wavelength conversion layer 62 provided on an incident surface 44a thereof. The light wavelength conversion layer 62 can be fabricated by coating the surface of the cover 44 with a material containing a phosphor similar to that in the light wavelength conversion member 46. Alternatively, a sheet-like light wavelength conversion layer 62 may be created in advance, and this may be affixed to the incident surface 44a of the cover 44. Alternatively, the cover 44 and the light wavelength conversion layer 62 may be manufactured through integral molding. The light wavelength conversion layer 62 may be provided on an exit surface 44b of the cover 44.

Fifth Embodiment

Figure 12:
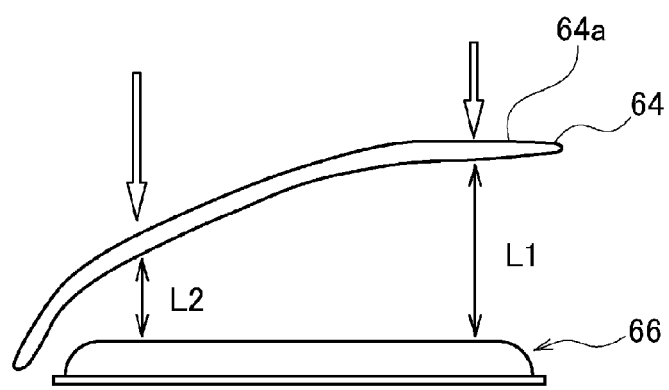
FIG. 12 is a schematic sectional view of a lamp in which a member having a curved surface, such as a lens (cover), serving as a translucent member and a linear LED module are combined.

For vehicle lamps in recent years, a variety of outer covers (lenses) that employ many curved surfaces are being devised from a standpoint of the design. FIG. 12 is a schematic sectional view of a lamp in which a member having a curved surface, such as a lens (cover), serving as a translucent member and a linear LED module are combined.

A lamp 330 illustrated in FIG. 12 includes a cover 64 having a curved surface and a light-emitting module 66 having a configuration similar to that of the lamp 100 with a flat substrate illustrated in FIG. 2. In this case, the distance L between the light-emitting module 66 and the cover 64 is not constant. Thus, when the distance L between the cover 64 and the light-emitting module 66 is large (L=L1), a corresponding exit surface 64a of the cover 64 becomes dim (low luminance). On the other hand, when the distance L between the cover 64 and the light-emitting module 66 is small (L=L2<L1), a corresponding exit surface 64a of the cover 64 becomes bright (high luminance). Thus, the gradation in brightness of the light-emitting surface is produced.

Figure 13:
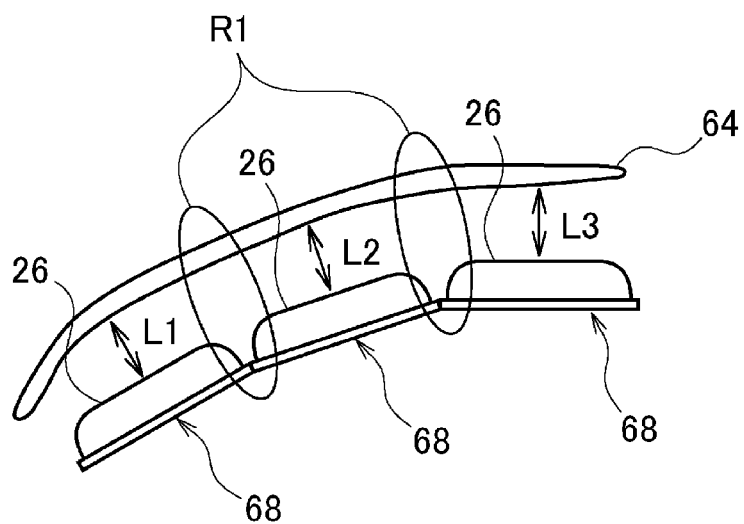
FIG. 13 is a schematic sectional view of a lamp in which the distance between a plurality of light-emitting modules and a cover is made substantially uniform.

FIG. 13 is a schematic sectional view of a lamp in which the distance between a plurality of light-emitting modules and a cover is made substantially uniform. In order to address the problem of the above-described lamp 330, a lamp 340 illustrated in FIG. 13 includes a plurality of short light-emitting modules 68, although the lamp 340 has a configuration similar to that of the lamp 100 illustrated in FIG. 2 having a flat substrate. The plurality of light-emitting modules 68 are disposed in mutually different orientations so as to follow the shape of the inner surface of the cover 64. Thus, the distance L between each of the light-emitting modules 68 and the cover 64 can be made substantially constant (L1≈L2≈L3). Consequently, the gradation in brightness of the light-emitting surface of the cover 64 can be reduced.

However, there is a region R1 in which no light wavelength conversion member 26 is present between adjacent light-emitting modules 68 in the lamp 340. Thus, a dim streak appears in a portion of the light-emitting surface of the cover 64, and the uniformity in the brightness (luminance) of the light-emitting surface of the cover 64 decreases. Furthermore, wires for feeding electricity to or controlling the light-emitting modules 68 need to be connected, which partially causes the cost to increase due to an increase in the manufacturing processes.

Therefore, a configuration for reducing the dim streak corresponding to the region R1 between the light-emitting modules has been devised. FIGS. 14A through 14D schematically illustrate modes of a light-emitting module according to a fifth embodiment. The basic configuration of the light-emitting module in each figure is substantially the same as that of the lamp 100 illustrated in FIG. 2, but the shape of the light wavelength conversion member differs in different modes.

Figure 14A:
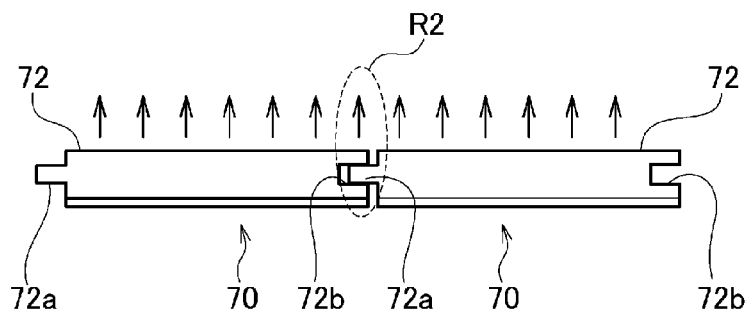
FIGS. 14A through 14D schematically illustrate modes of a light-emitting module according to a fifth embodiment.

A light-emitting module 70 illustrated in FIG. 14A includes a projection portion 72a that projects from one end of a linear light wavelength conversion member 72 in the longitudinal direction. In addition, a recess portion 72b shaped to fittingly accept a projection portion 72a of an adjacent light-emitting module 70 is formed at another end of the light wavelength conversion member 72. With this, the light wavelength conversion member 72 is present even in a boundary region R2 between the adjacent light-emitting modules 70, and thus the uniformity in the brightness of the light-emitting surfaces of the plurality of light-emitting modules disposed side by side increases.

Figure 14B:
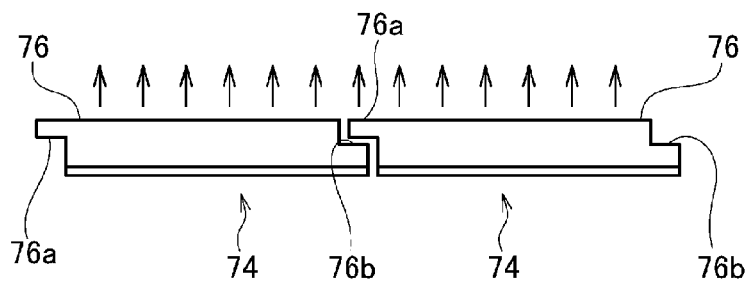

A light-emitting module 74 illustrated in FIG. 14B includes a step-like projection 76a at one end of a linear light wavelength conversion member 76. In addition, a step 76b for a projection 76a of an adjacent light wavelength conversion member 76 to fit thereto is formed at another end of the light wavelength conversion member 76. With this, the light wavelength conversion member 76 is present even in a boundary region between the adjacent light-emitting modules 74, and thus the uniformity in the brightness of the light-emitting surfaces of the plurality of light-emitting modules disposed side by side increases.

Figure 14C:
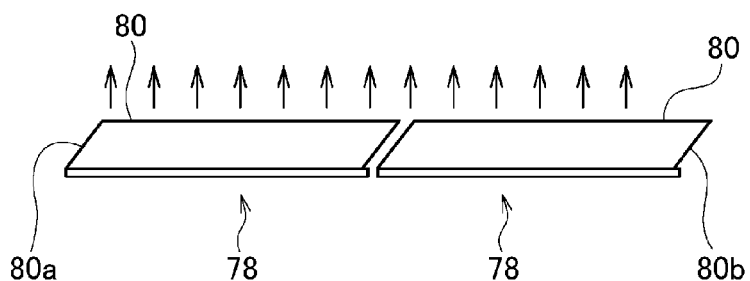
Figure 14D:
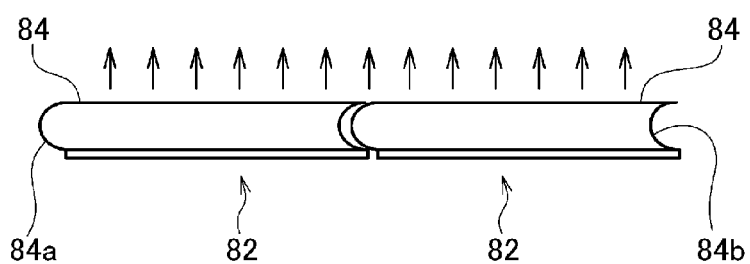

In a light-emitting module 78 illustrated in FIG. 14C, two ends of a linear light wavelength conversion member 80 constitute sloped sides 80a and 80b as viewed from the side. In addition, a light-emitting module 82 illustrated in FIG. 14D includes a semicolumnar projection portion 84a formed at one end of a linear light wavelength conversion member 84. In addition, a semicylindrical recess groove 84b shaped to fittingly accept a projection portion 84a of an adjacent light-emitting module 82 is formed at another end of the light wavelength conversion member 84. In this manner, by appropriately designing the shapes of the two ends of a light wavelength conversion member, a portion of a light wavelength conversion member can be stacked on a portion of another light wavelength conversion member. Accordingly, a light wavelength conversion member is present even in a boundary region between the light-emitting modules 78 or between the light-emitting modules 82, and thus the uniformity in the brightness of the light-emitting surfaces of the plurality of light-emitting modules disposed side by side increases.

Sixth Embodiment

Figure 15:
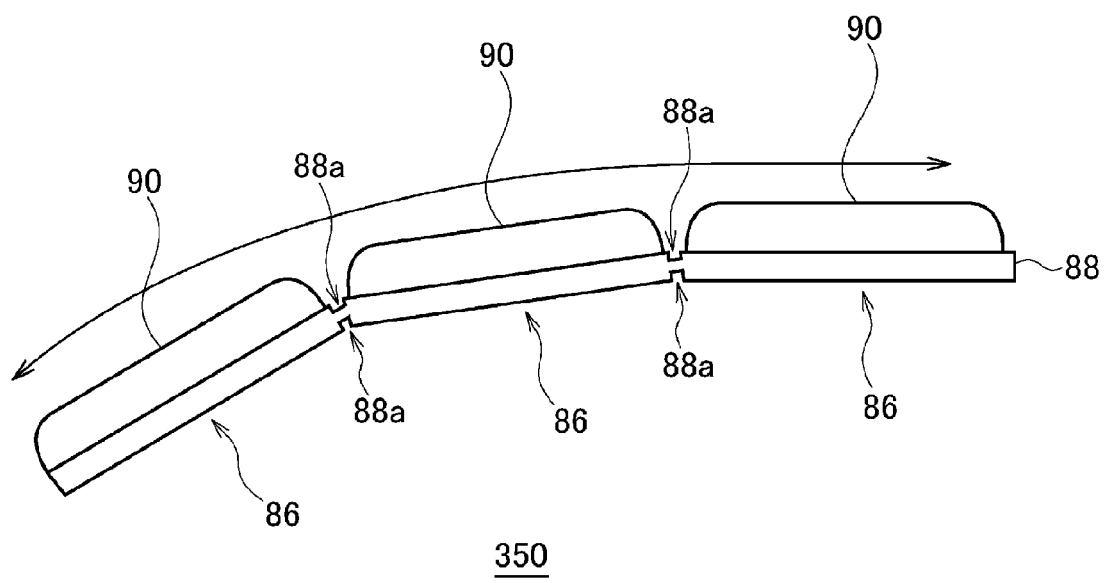
FIG. 15 is a schematic diagram illustrating a primary portion of a lamp according to a sixth embodiment.

FIG. 15 is a schematic diagram illustrating a primary portion of a lamp according to a sixth embodiment. A lamp 350 has a structure similar to that of the lamp 340 illustrated in FIG. 13, but a plurality of light-emitting modules 86 share a common substrate 88. Therefore, when the plurality of light-emitting modules 86 are to be disposed in mutually different orientations so as to follow the shape of the inner surface of the cover in accordance with the cover having a curved surface, the substrate needs to be bent. However, when the substrate is made of a hard material, it is difficult to bend the substrate.

Therefore, in the substrate 88 shared by the light-emitting modules 86 of the lamp 350, a notch 88a is formed in at least one of the upper surface and the lower surface in a region between adjacent light wavelength conversion members 90. Thus, even when the substrate 88 is made of a relatively hard material, the substrate 88 can be bent more easily.

Figure 16A:
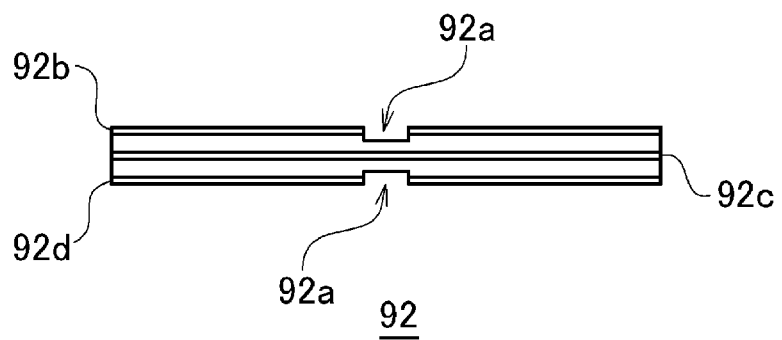
FIGS. 16A through 16C are sectional views for describing examples of a substrate that can be employed in a light-emitting module according to the sixth embodiment.
Figure 16B:
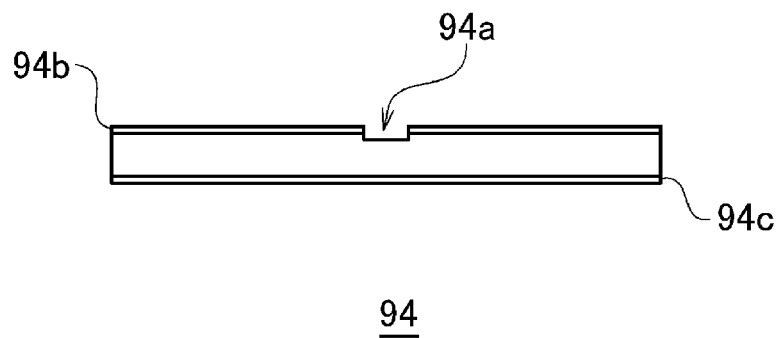
Figure 16C:
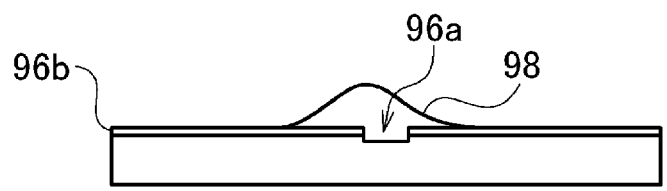

Meanwhile, when a notch is formed in a substrate, there is a possibility that a wire in the surface layer is cut. FIGS. 16A through 16C are sectional views for describing examples of a substrate that can be employed in the light-emitting module according to the sixth embodiment.

In a substrate 92 illustrated in FIG. 16A, pattern wires 92b, 92c, and 92d are formed on two surfaces and between layers. Therefore, even when notches 92a are present in the respective surfaces, adjacent light-emitting modules can be electrically continuous at least through the pattern wire 92c present between layers.

In a substrate 94 illustrated in FIG. 16B, pattern wires 94b and 94c are formed only on the two surfaces. Therefore, a notch 94a is formed only in one of the principal surfaces of the substrate 94 and is not formed in the other principal surface. Thus, adjacent light-emitting modules can be electrically continuous at least through the pattern wire 94c present on the other principal surface.

In a substrate 96 illustrated in FIG. 16C, a pattern wire 96b is formed only on one surface. Therefore, when a notch 96a is formed, the pattern wire 96b is cut midway. Thus, in such a case, a cord 98 is connected to the pattern wire 96b so as to stretch over the notch 96a.

Seventh Embodiment

Figure 17:
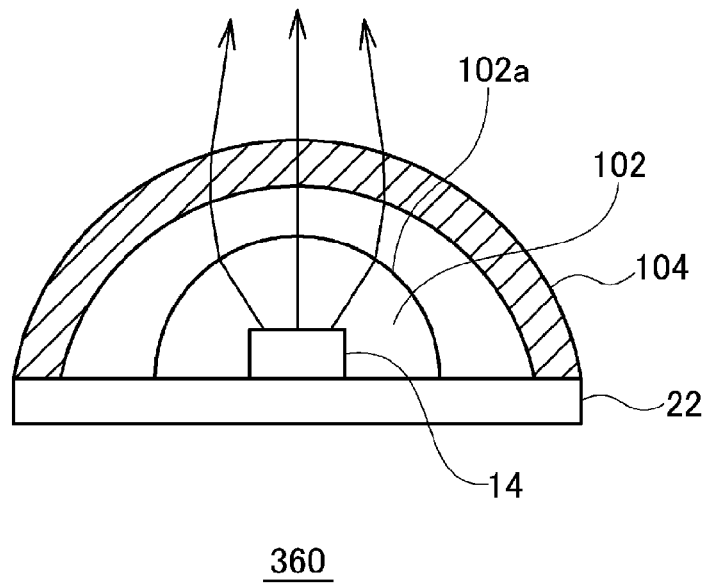
FIG. 17 is a schematic sectional view of a lamp according to a seventh embodiment.

FIG. 17 is a schematic sectional view of a lamp 360 according to a seventh embodiment. The lamp 360 includes a plurality of semiconductor light-emitting elements 14 arrayed in a direction perpendicular to the paper plane of FIG. 17, an aluminum substrate 22 on which the plurality of semiconductor light-emitting elements 14 are mounted, a semicolumnar translucent member 102 that seals the plurality of semiconductor light-emitting elements 14, and a semicylindrical light wavelength conversion member 104 disposed at a distance from the surface of the translucent member 102 so as to cover the translucent member 102.

The translucent member 102 has such a lens shape that causes the light emitted by the semiconductor light-emitting element 14 to be refracted when exiting through a surface 102a. In addition, the light wavelength conversion member 104 may have such a shape that causes the incident element light to be refracted and condensed. Thus, the luminous intensity of the lamp 360 in the front direction (the upper side of the semiconductor light-emitting element 14) can be improved.

Eighth Embodiment

Figure 18:
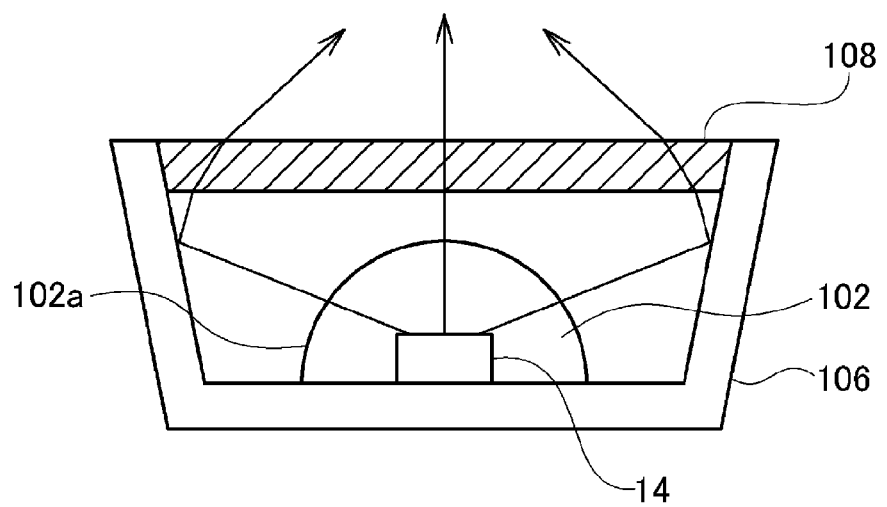
FIG. 18 is a schematic sectional view of a lamp according to an eighth embodiment.

FIG. 18 is a schematic sectional view of a lamp 370 according to an eighth embodiment. The lamp 370 includes a plurality of semiconductor light-emitting elements 14 arrayed in a direction perpendicular to the paper plane of FIG. 18, a reflector 106 that also functions as a substrate on which the plurality of semiconductor light-emitting elements 14 are mounted, a semicolumnar translucent member 102 that seals the plurality of semiconductor light-emitting elements 14, and a plate-like light wavelength conversion member 108 disposed at a distance from the surface of the translucent member 102 so as to close the opening of the reflector 106.

The translucent member 102 may have such a lens shape that causes the light emitted by the semiconductor light-emitting element 14 to be refracted when exiting through the surface 102a. In addition, the reflector 106 is a member that has a recessed sectional shape and whose inner surface is processed into a reflection portion. The reflector 106 has such a reflective surface formed thereon that reflects the light radiated through the translucent member 102 toward the sides so as to reflect (condense) the light in the direction toward the front of the lamp. Thus, the luminous intensity of the lamp 370 in the front direction (the upper side of the semiconductor light-emitting element 14) can be improved.

Figure 19:
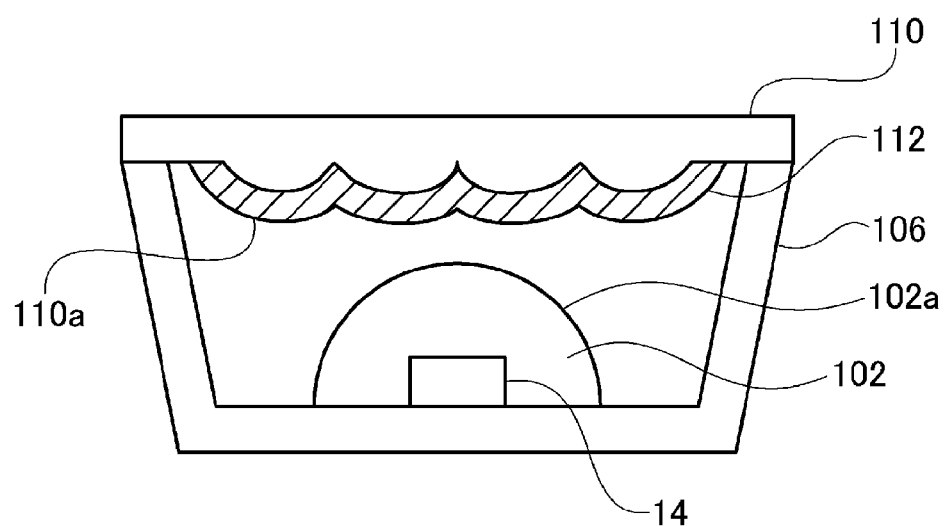
FIG. 19 is a schematic sectional view of a lamp according to a modification of the eighth embodiment.

FIG. 19 is a schematic sectional view of a lamp 380 according to a modification of the eighth embodiment. In the lamp 380, in place of the plate-like light wavelength conversion member 108 of the lamp 370, a light wavelength conversion layer 112 is formed on a corrugated (concave-convex) surface 110a (scattering surface) of an outer lens 110 that is toward the semiconductor light-emitting element 14. The light wavelength conversion layer 112 may be formed by coating the corrugated surface 110a with a resin containing a phosphor or may be formed by integrating a resin sheet containing a phosphor with the outer lens 110.

Thus far, the present invention has been described on the basis of embodiments and examples. These embodiments are merely illustrative, and it should be appreciated by a person skilled in the art that various modifications can be made to the combinations of the constituent elements and the processing processes of the embodiments and that such modifications also fall within the scope of the present invention.

What is claimed is:

1. A lamp comprising:
a plurality of light-emitting elements arrayed linearly; a substrate on which the plurality of light-emitting elements are mounted; and
a linear light wavelength conversion member disposed separated from of the plurality of light-emitting elements' light-emitting surfaces; wherein
the substrate includes a circuit formed such as to be able to switch on/off the plurality of light-emitting elements, as grouped into a plurality of sets, on a per-set basis in which the sets are composed of either one or a plurality of the light-emitting elements, and
the light wavelength conversion member includes:
a retaining member provided on a conversion-member side opposing the plurality of light-emitting elements; and
a phosphor-containing resin layer retained by the retaining member.

2. The lamp according to claim 1, wherein the light wavelength conversion member includes:
a groove provided to the retaining member; and
a phosphor-containing resin layer filling the groove in the retaining member.

3. The lamp according to claim 1, further comprising:
either a light-shielder or a light wavelength convertor for making it so that among component light emitted by the light-emitting elements, component light not directed to the phosphor-containing resin layer does not as-is penetrate exteriorly.

4. The lamp according to claim 1, adapted for a motor vehicle, wherein:

the substrate includes a first substrate section and a second substrate section carrying respective pluralities of the light-emitting elements;

the first substrate section is disposed such that the light-emitting surfaces of the carried plurality of light-emitting elements are oriented either vehicle-frontward or a vehicle-rearward; and the second substrate section is disposed such as to be oriented vehicle-sideward of the light-emitting surfaces of the plurality of light-emitting elements carried on the first substrate section.

5. The lamp according to claim 4, wherein the plurality of light-emitting elements carried on the first substrate section are of mounting density higher than mounting density of the light-emitting elements carried on the second substrate section.

6. The lamp according to claim 4, wherein the light-emitting elements carried on the first substrate section are disposed vertically in a plurality of arrays extending vehicle-widthwise.

7. The lamp according to claim 1, wherein:
the substrate includes a plurality of carrying sections extending vehicle-widthwise in a terraced form;
the plurality of carrying sections are formed such as to be oriented either vehicle-frontward or vehicle-rearward; and
the light-emitting elements are carried respectively on the carrying sections.

8. The lamp according to claim 1, wherein the light-emitting elements have a peak wavelength in a range of 380-470 nm.

9. The lamp according to claim 1, wherein the light wavelength conversion member contains a phosphor having a dominant wavelength in a range of 585-610 nm.

* * * * *